US011289076B2

(12) United States Patent
Stelmar Netto et al.

(10) Patent No.: US 11,289,076 B2
(45) Date of Patent: Mar. 29, 2022

(54) ASSISTING MEETING PARTICIPANTS VIA CONVERSATION LOOP DETECTION AND RESOLUTION USING CONVERSATION VISUAL REPRESENTATIONS AND TIME-RELATED TOPIC USAGE

(71) Applicant: Kyndryl, Inc., New York, NY (US)

(72) Inventors: Marco Aurelio Stelmar Netto, Sao Paulo (BR); Livia Moreno de Marco Cantieri, Rio de Janeiro (BR); Ricardo Ferrareto Jayme, Sao Paulo (BR); Rodrigo Jungi Suzuki, Minas Gerais (BR); Daniel Neves Zanon, Sao Paulo (BR)

(73) Assignee: Kyndryl, Inc., New York, NY (US)

( * ) Notice: Subject to any disclaimer, the term of this patent is extended or adjusted under 35 U.S.C. 154(b) by 279 days.

(21) Appl. No.: 16/815,345

(22) Filed: Mar. 11, 2020

(65) Prior Publication Data

US 2021/0287668 A1    Sep. 16, 2021

(51) Int. Cl.
*G10L 15/25* (2013.01)
*G10L 15/18* (2013.01)
(Continued)

(52) U.S. Cl.
CPC .......... *G10L 15/1815* (2013.01); *G06F 16/26* (2019.01); *G06N 5/02* (2013.01);
(Continued)

(58) Field of Classification Search
CPC ..... G10L 15/1815; G10L 15/22; G10L 15/30; G10L 25/63; G10L 15/24–26;
(Continued)

(56) References Cited

U.S. PATENT DOCUMENTS

| 1,038,988 A | 9/1912 | Tilford |
| 6,754,631 B1 | 6/2004 | Din |

(Continued)

FOREIGN PATENT DOCUMENTS

CN    102572372 A    7/2012

OTHER PUBLICATIONS

Mell et al., "The NIST Definition of Cloud Computing," Computer Security Division, National Institute of Standards and Technology, Jan. 2011, 7 pages.

(Continued)

*Primary Examiner* — Abul K Azad
(74) *Attorney, Agent, or Firm* — Yee & Associates, P.C.

(57) ABSTRACT

Detecting and resolving conversation loops during a meeting is provided. A conversation between a set of participating entities is monitored during the meeting. A visual representation of the conversation is updated within a dashboard when one or more of a first predefined set of triggers are activated based on monitoring the conversation. A conversation loop is detected in the conversation when one or more of a second predefined set of triggers are activated based on monitoring the conversation and updating the visual representation of the conversation within the dashboard. Support materials that provide support for resolving the conversation loop are retrieved from at least one of local sources including a knowledgebase and remote sources including websites. The support materials are displayed in the dashboard along with an input section for the set of participating entities to indicate a consensus for resolving the conversation loop.

20 Claims, 9 Drawing Sheets

(51) Int. Cl.
*G06N 5/02* (2006.01)
*G06F 16/26* (2019.01)
*G06N 20/00* (2019.01)
*G06Q 10/10* (2012.01)
*G10L 15/30* (2013.01)
*G10L 15/22* (2006.01)
*G10L 25/63* (2013.01)
*G10L 15/08* (2006.01)

(52) U.S. Cl.
CPC ........... *G06N 20/00* (2019.01); *G06Q 10/109*
(2013.01); *G10L 15/22* (2013.01); *G10L 15/30*
(2013.01); *G10L 25/63* (2013.01); *G06F*
*2221/2143* (2013.01); *G10L 2015/088*
(2013.01); *G10L 2015/223* (2013.01)

(58) Field of Classification Search
CPC ........ G10L 2015/088; G10L 2015/223; G06N
20/00; G06N 5/02; G06Q 10/109; G06F
2221/2143
See application file for complete search history.

(56) References Cited

U.S. PATENT DOCUMENTS

| | | | |
|---|---|---|---|
| 7,769,705 | B1 | 8/2010 | Luechtefeld |
| 7,908,143 | B2 | 3/2011 | Kankar et al. |
| 8,266,534 | B2 | 9/2012 | Curtis et al. |
| 9,070,369 | B2 | 6/2015 | Cox et al. |
| 2004/0098265 | A1 | 5/2004 | Kelly et al. |
| 2006/0095273 | A1 | 5/2006 | Montvay et al. |
| 2006/0224430 | A1 | 10/2006 | Butt |
| 2007/0112926 | A1 | 5/2007 | Brett et al. |
| 2010/0070485 | A1* | 3/2010 | Parsons ............... G06F 16/9535 709/224 |
| 2011/0010173 | A1* | 1/2011 | Scott ....................... G10L 15/26 704/235 |
| 2014/0108085 | A1 | 4/2014 | Henriksen et al. |
| 2014/0164510 | A1 | 6/2014 | Abuelsaad et al. |
| 2015/0347966 | A1 | 12/2015 | Saunders |
| 2016/0117624 | A1 | 4/2016 | Flores et al. |
| 2018/0012619 | A1* | 1/2018 | Ryan ................... H04M 3/5183 |
| 2018/0122111 | A1* | 5/2018 | Silva ....................... G06F 16/26 |
| 2019/0266238 | A1 | 8/2019 | Faulkner et al. |

OTHER PUBLICATIONS

Renals, "Automatic analysis of multiparty meetings," Indian Academy of Sciences, Sadhana vol. 36, Part 5, Oct. 2011, pp. 917-932. https://www.ias.ac.in/article/fulltext/sadh/036/05/0917-0932.
Anonymous, ""Smart assistance for meetings,"" An IP.com Prior Art Database Technical Disclosure, IPCOM000251788D, Dec. 4, 2017, 7 pages.https://priorart.ip.com/IPCOM/000251788.
"Turn Your Conversations into Knowledge," reason8, accessed Feb. 27, 2020, Copyright 2020, 6 pages. https://reason8.ai/.
"Otter Voice Meeting Notes," Otter, accessed Feb. 27, 2020, Copyright 2020, 8 pages. https://otter.ai/login.
"Your digital AI meeting assistant has arrived," Cisco Webex, accessed Feb. 27, 2020, Copyright 2020, 9 pages. https://www.webex.com/ai-assistant.html.
"Stop wasting time in meetings. Make yours count!" MeetingKing, Meeting Agenda & Meeting Minutes Software, accessed Feb. 27, 2020, Copyright 2011-2019, Paracas Solutions LLC, 7 pages. https://meetingking.com/.
Minute, Easy Meetings, Copyright 2012-2020, Decos Minute BV, accessed Mar. 11, 2020, 8 pages. https://www.getminute.com/.
Taskade, The Unified Workspace, Copyright 2020, accessed Mar. 11, 2020, 6 pages. https://www.taskade.com/.
Soapbox, A New Era in Video Sharing, Copyright 2019, SoapBox Network Inc., accessed Mar. 11, 2020, 11 pages. https://www.soapbox.net/.
Chiu et al., "LiteMinutes: An Internet-Based System for Multimedia Meeting Minutes," WWW10: Proceedings of the 10th international conference on World Wide Web, May 2-5, 2001, Hong Kong, pp. 140-149.
Johnson-Robertson et al., "Enhanced Visual Scene Understanding through Human-Robot Dialog," 2011 IEEE/RSJ International Conference on Intelligent Robots and Systems, Sep. 25-30, 2011, San Francisco, CA, 7 pages.
Kiss et al., "Closed Loop Dialog Model of Face-to-Face Communication with a Photo-Real Virtual Human," Visual Communications and Image Processing 2004, Jan. 18-22, 2004, San Jose, California, 7 pages.

* cited by examiner

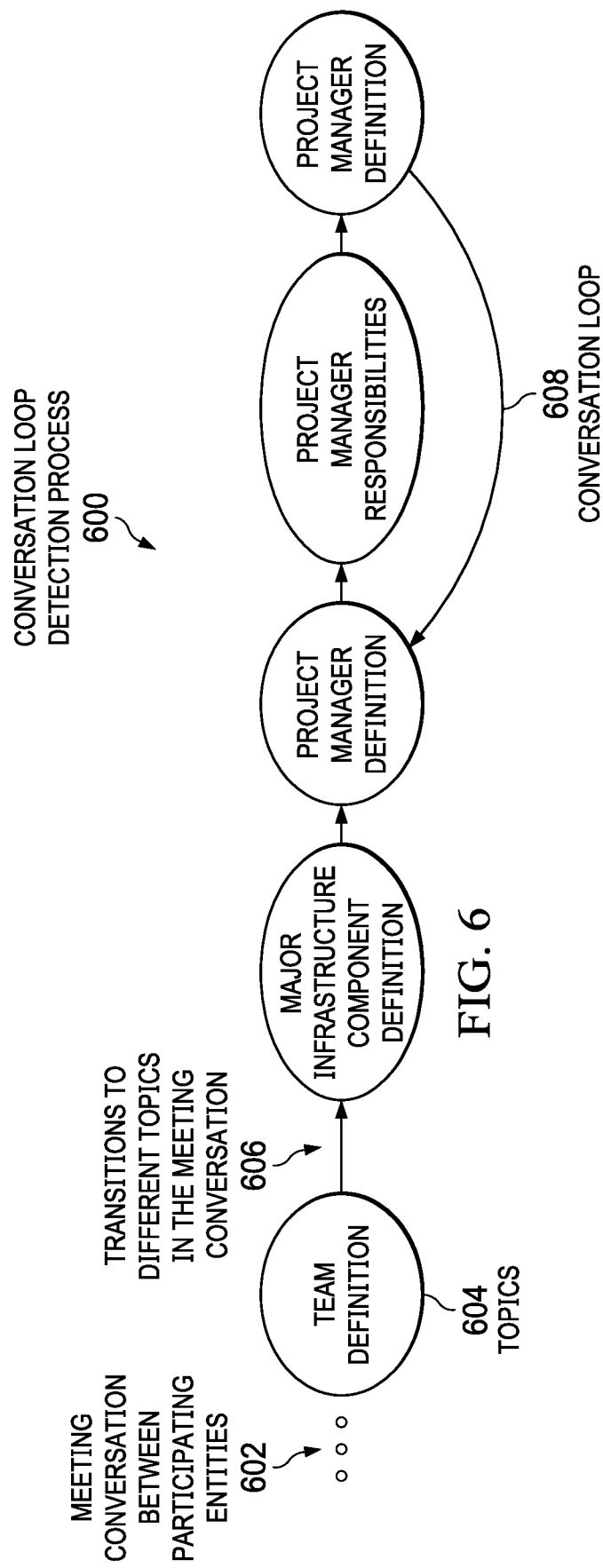

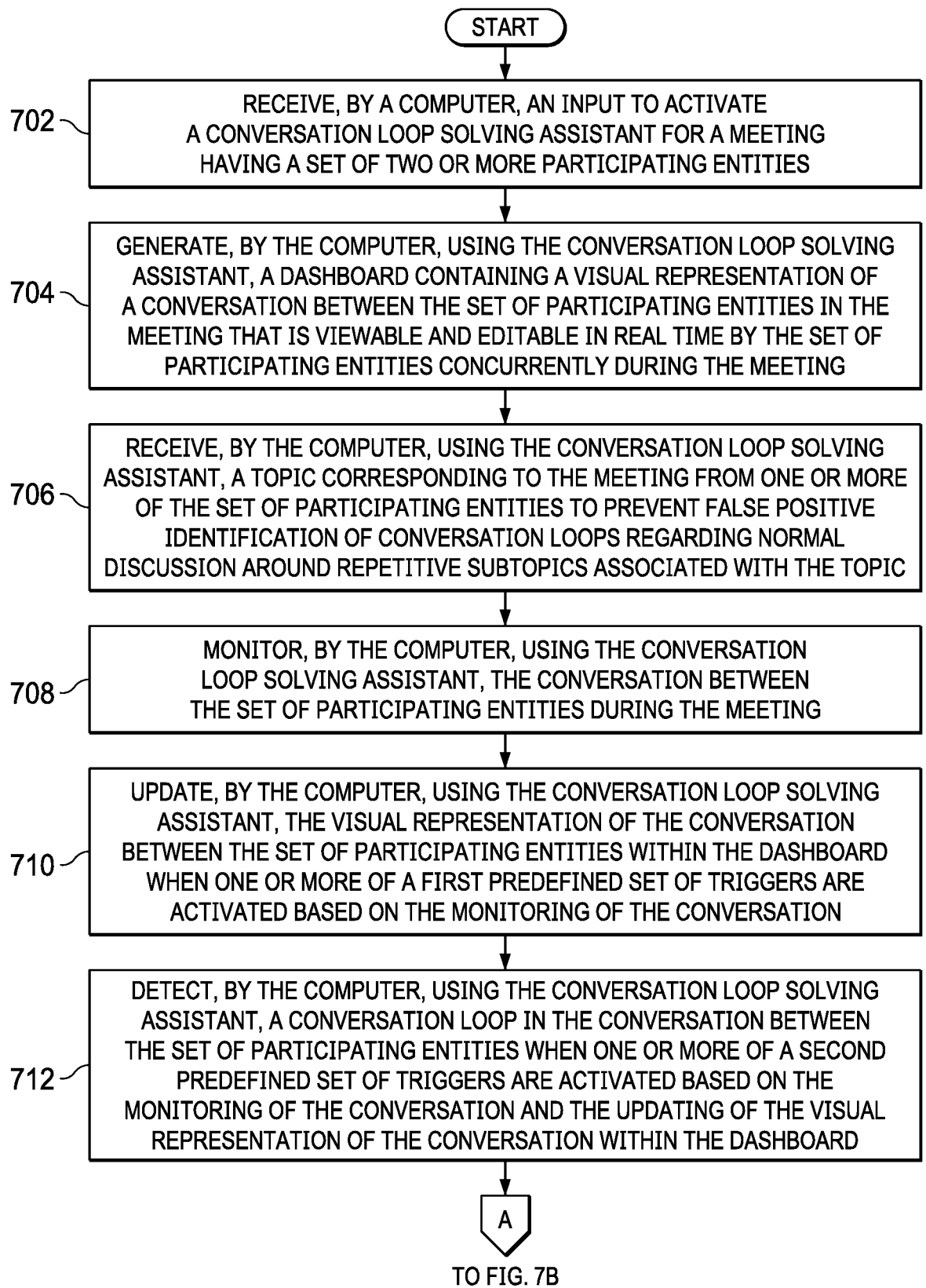

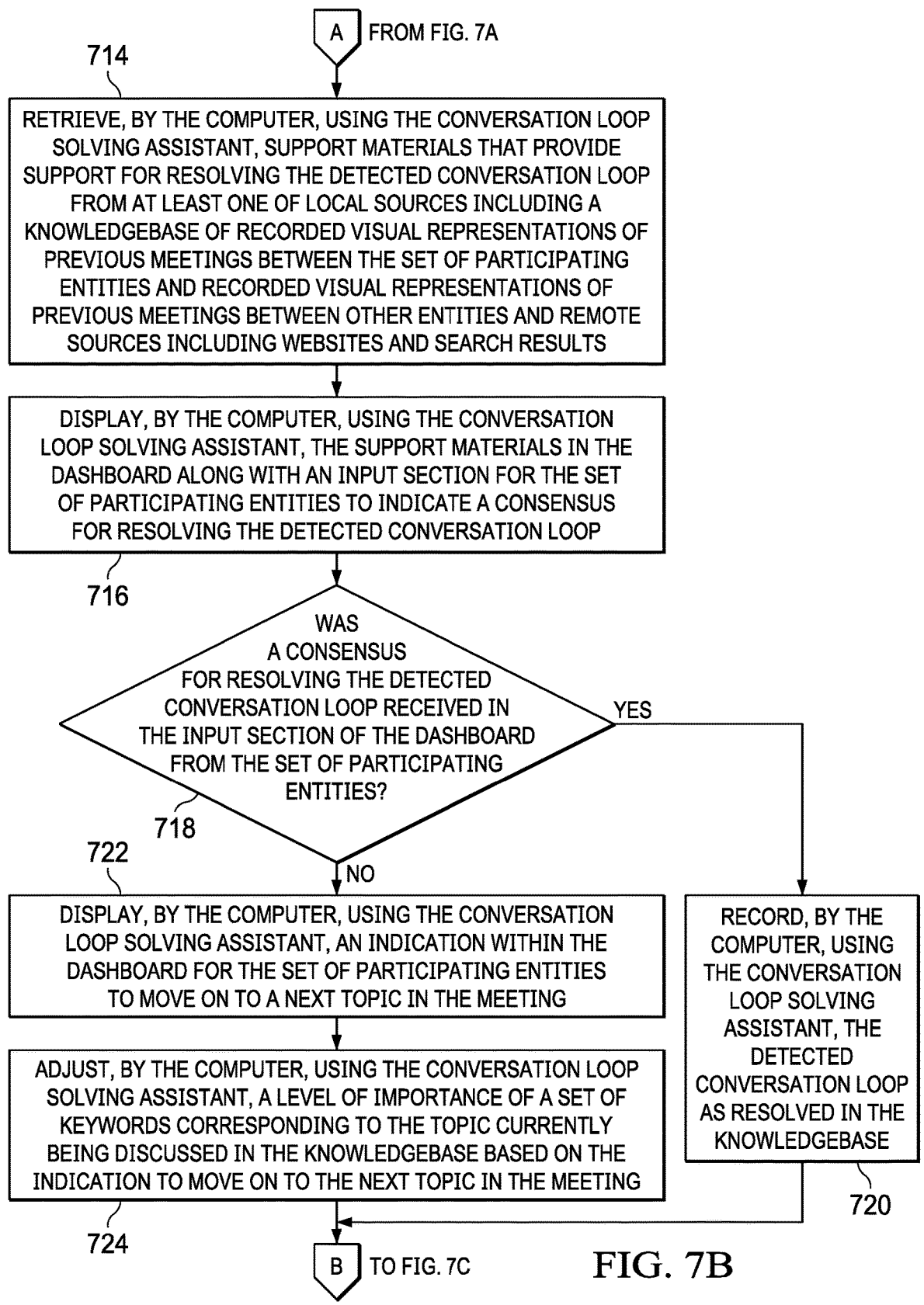

ASSISTING MEETING PARTICIPANTS VIA CONVERSATION LOOP DETECTION AND RESOLUTION USING CONVERSATION VISUAL REPRESENTATIONS AND TIME-RELATED TOPIC USAGE

BACKGROUND

1. Field

The disclosure relates generally to multiparticipant meetings and more specifically to assisting meeting participants via conversation loop detection and resolution using an improved graphical user interface dashboard that includes conversation visual representations and time-related usage of topics during the meeting in real time.

2. Description of the Related Art

A meeting is an act or process of coming together by a set of two or more people to discuss a set of one or more topics, often in a formal or business setting. Generally, the meeting is convened for the purpose of achieving a common goal through verbal interaction, such as, for example, sharing information or reaching an agreement. However, conducting an effective meeting may be challenging. For example, there are bad meetings and there are good meetings. A bad meeting seems to last forever and participants never seem to get the point of the meeting and leave wondering why they were even present. Conversely, a good meeting typically makes participants feel that they got the point of the meeting and leave having a sense of accomplishment. In other words, a good meeting achieves the objective of the meeting, requires a minimum amount of time, and leaves participants with a feeling of success.

SUMMARY

According to one illustrative embodiment, a computer-implemented method for detecting and resolving conversation loops during a meeting is provided. A computer monitors a conversation between a set of participating entities during the meeting. The computer updates a visual representation of the conversation between the set of participating entities within a dashboard when one or more of a first predefined set of triggers are activated based on monitoring the conversation. The computer detects a conversation loop in the conversation between the set of participating entities when one or more of a second predefined set of triggers are activated based on monitoring the conversation and updating the visual representation of the conversation within the dashboard. The computer retrieves support materials that provide support for resolving the conversation loop from at least one of local sources including a knowledgebase and remote sources including websites. The computer displays the support materials in the dashboard along with an input section for the set of participating entities to indicate a consensus for resolving the conversation loop. According to other illustrative embodiments, a computer system and computer program product for detecting and resolving conversation loops during a meeting are provided.

BRIEF DESCRIPTION OF THE DRAWINGS

FIG. 6 is a diagram illustrating an example of a conversation loop detection process in accordance with an illustrative embodiment; and FIGS. 7A-7C are a flowchart illustrating a process for detecting and resolving conversation loops during a meeting in accordance with an illustrative embodiment.

DETAILED DESCRIPTION

Figure 1:
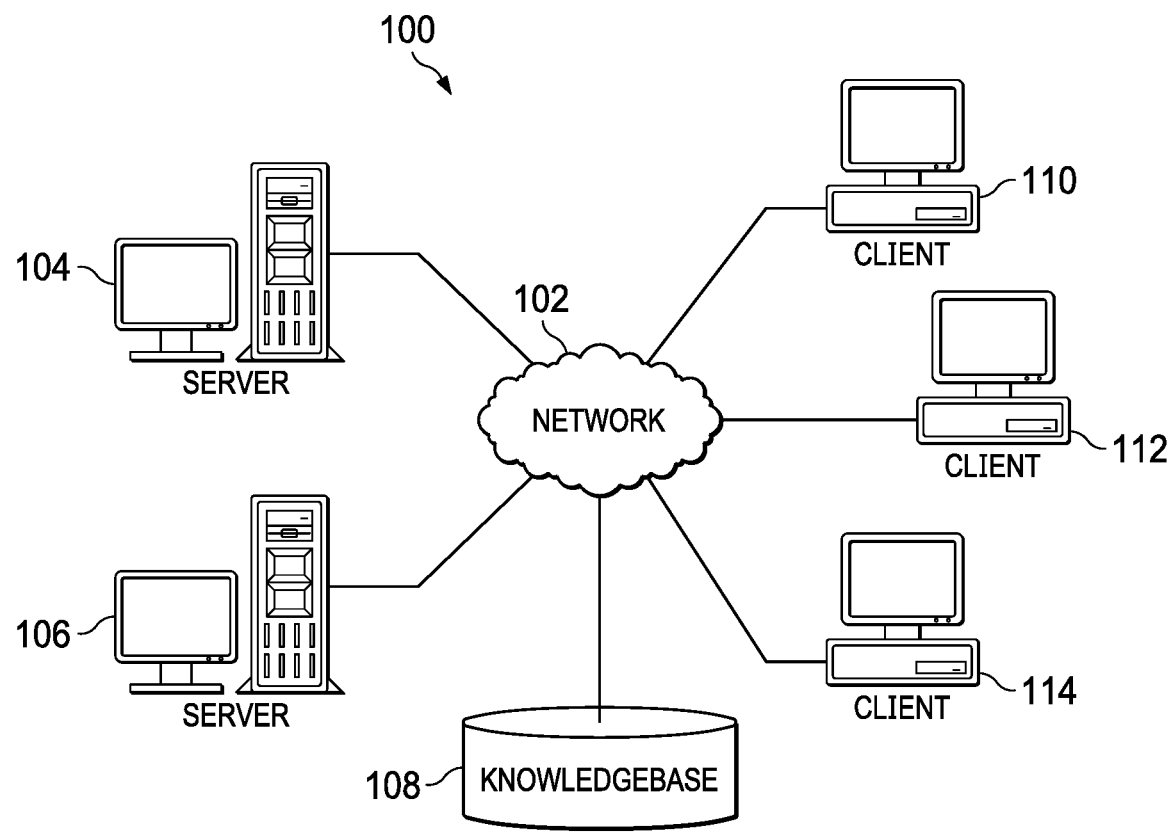
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular, with reference to FIGS. 1-5, diagrams of data processing environments are provided in which illustrative embodiments may be implemented. It should be appreciated that FIGS. 1-5 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, fiber optic cables, and the like.

In the depicted example, server 104 and server 106 connect to network 102, along with knowledgebase 108. Server 104 and server 106 may be, for example, server computers with high-speed connections to network 102. In addition, server 104 and server 106 provide services to client devices for detecting and resolving conversation loops that occur during conversations between participating entities in multiparticipant meetings. A conversation is an interactive communication between two or more participating entities. Participating entities may be selected from a group consisting of people and artificial intelligence-based systems. An artificial intelligence-based system may be, for example, an automated bot. In the context of a meeting, a conversation has a set of one or more goals to be accomplished and discussed within a defined time-frame for the meeting. A conversation loop is when one or more participating entities during the course of a meeting return to a previously discussed topic (i.e., repeat a topic multiple times).

It should be noted that server 104 and server 106 may represent multiple computing nodes in one or more cloud environments. Alternatively, server 104 and server 106 may represent servers in a local data processing environment, such as, for example, on premise of an organization, enterprise, business, company, institution, agency, or the like.

Client 110, client 112, and client 114 also connect to network 102. Clients 110, 112, and 114 are clients of server 104 and server 106. In this example, clients 110, 112, and 114 are shown as desktop or personal computers with wire communication links to network 102. However, it should be noted that clients 110, 112, and 114 are examples only and may represent other types of data processing systems, such as, for example, network computers, laptop computers, handheld computers, smart phones, smart watches, smart televisions, and the like, with wire or wireless communication links to network 102. Users of clients 110, 112, and 114 may utilize clients 110, 112, and 114 to access and utilize the conversation loop detection and resolution services provided by server 104 and server 106. In other words, the users of clients 110, 112, and 114 are participating entities in a meeting.

Knowledgebase 108 is a network storage device capable of storing any type of data in a structured format or an unstructured format. In addition, knowledgebase 108 may represent a plurality of network storage devices. Further, knowledgebase 108 may store identifiers and network addresses for a plurality of different client devices, identifiers for a plurality of different client device users, data regarding previous meeting conversations, user feedback regarding the previous meeting conversations, information regarding a plurality of different topics and related concepts, concept maps, mind maps, information regarding resolution of previously detected conversation loops, and the like.

A concept map is a diagram that depicts relationships between topics and concepts. A concept map typically represents information and ideas as boxes or circles, which are connected by labeled arrows in a downward-branching hierarchical structure. A relationship between topics or concepts can be articulated by meeting participants using linking phrases, such as, for example, "causes", "requires", "contributes to", or the like. A mind map is a diagram that visually organizes information. A mind map shows relationships among information pieces of the whole. A mind map is often created around a single topic or concept, which is shown in the center of the map, to which associated information, such as, for example, words, phrases, images, or the like, are added around the central topic or concept. Mind maps differ from concept maps in that mind maps typically focus on only one topic or concept, whereas concept maps connect multiple topics or concepts.

Furthermore, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), a wide area network (WAN), a telecommunications network, or any combination thereof. FIG. 1 is intended as an example only, and not as an architectural limitation for the different illustrative embodiments.

Figure 2:
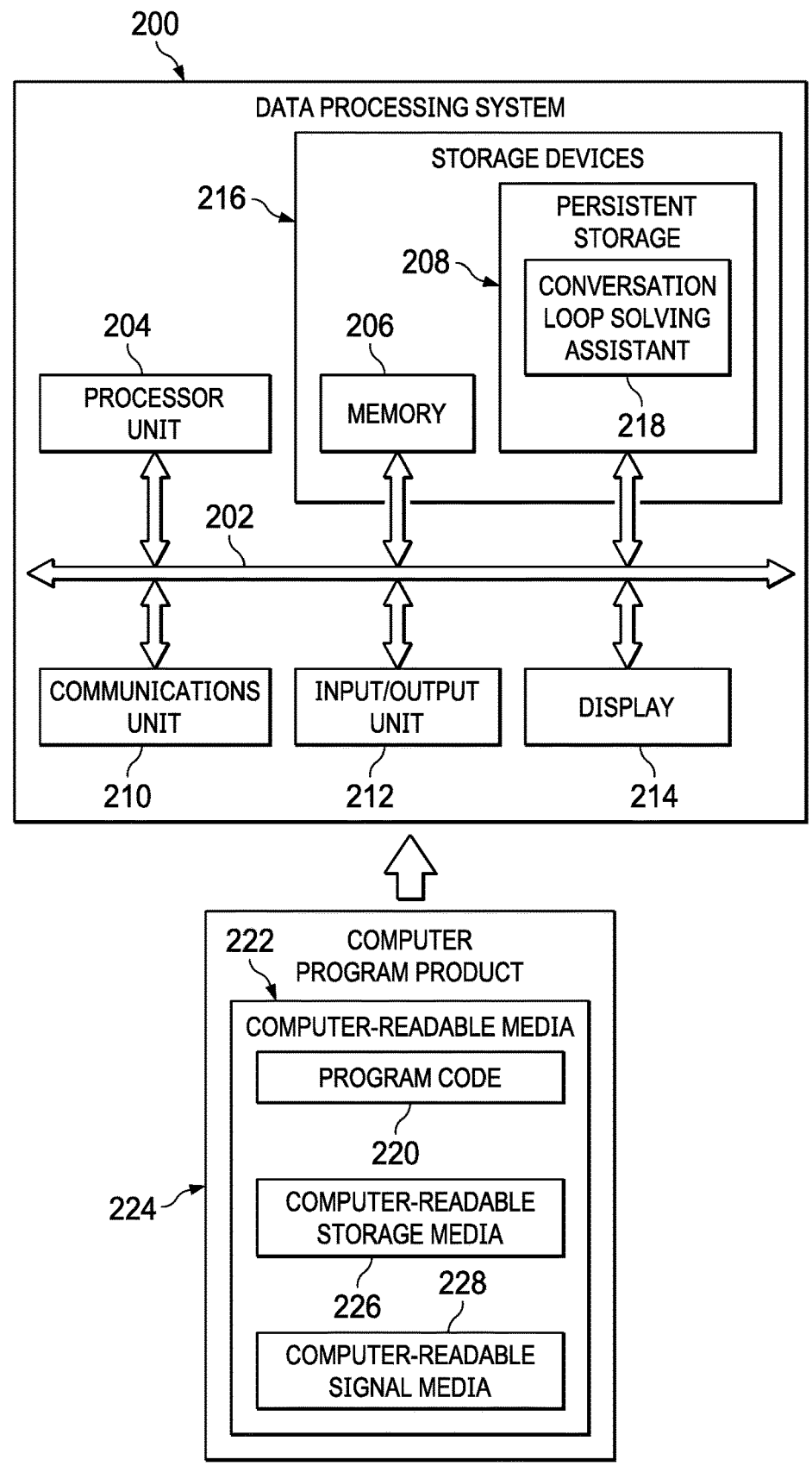
FIG. 2 is a diagram of a data processing system in which illustrative embodiments may be implemented.

With reference now to FIG. 2, a diagram of a data processing system is depicted in accordance with an illustrative embodiment. Data processing system 200 is an example of a computer, such as server 104 in FIG. 1, in which computer readable program code or instructions implementing processes of illustrative embodiments may be located. In this example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis or a persistent basis. Further, a computer readable storage device excludes a propagation medium. Memory 206, in these examples, may be, for example, a random-access memory (RAM), or any other suitable volatile or non-volatile storage device, such as a flash memory. Persistent storage 208 may take various forms, depending on the particular implementation. For example, persistent storage 208 may contain one or more devices. For example, persistent storage 208 may be a disk drive, a solid-state drive, a rewritable optical disk, a rewritable magnetic tape, or some combination of the above. The media used by persistent storage 208 may be removable. For example, a removable hard drive may be used for persistent storage 208.

In this example, persistent storage 208 stores conversation loop solving assistant 218. However, it should be noted that even though conversation loop solving assistant 218 is illustrated as residing in persistent storage 208, in an alternative illustrative embodiment conversation loop solving assistant 218 may be a separate component of data processing system 200. For example, conversation loop solving assistant 218 may be a hardware component coupled to communication fabric 202 or a combination of hardware and software components. In another alternative illustrative embodiment, a first set of components of conversation loop solving assistant 218 may be located in data processing system 200 and a second set of components of conversation loop solving assistant 218 may be located in a second data processing system, such as, for example, server 106 in FIG. 1.

Conversation loop solving assistant 218 controls the process of detecting and resolving any conversation loops that may occur during conversations between participating entities in multiparticipant meetings by generating an evolving visual representation of a meeting conversation, which may include a concept map, a mind map, a graphic indication of where a detected conversation loop is occurring, a participant conversation loop feedback input area, and the like, within a graphical user interface dashboard viewable and editable by the participating entities. As a result, data processing system 200 operates as a special purpose computer system in which conversation loop solving assistant 218 in data processing system 200 enables detection and resolution of conversation loops during meetings in real time. In particular, conversation loop solving assistant 218 transforms data processing system 200 into a special purpose computer system as compared to currently available general computer systems that do not have conversation loop solving assistant 218.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultrahigh frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 220 is located in a functional form on computer readable media 222 that is selectively removable and may be loaded onto or transferred to data processing system 200 for running by processor unit 204. Program code 220 and computer readable media 222 form computer program product 224. In one example, computer readable media 222 may be computer readable storage media 226 or computer readable signal media 228.

In these illustrative examples, computer readable storage media 226 is a physical or tangible storage device used to store program code 220 rather than a medium that propagates or transmits program code 220. Computer readable storage media 226 may include, for example, an optical or magnetic disc that is inserted or placed into a drive or other device that is part of persistent storage 208 for transfer onto a storage device, such as a hard drive, that is part of persistent storage 208. Computer readable storage media 226 also may take the form of a persistent storage, such as a hard drive, a thumb drive, or a flash memory that is connected to data processing system 200.

Alternatively, program code 220 may be transferred to data processing system 200 using computer readable signal media 228. Computer readable signal media 228 may be, for example, a propagated data signal containing program code 220. For example, computer readable signal media 228 may be an electromagnetic signal, an optical signal, or any other suitable type of signal. These signals may be transmitted over communication links, such as wireless communication links, an optical fiber cable, a coaxial cable, a wire, or any other suitable type of communications link.

Further, as used herein, "computer readable media 222" can be singular or plural. For example, program code 220 can be located in computer readable media 222 in the form of a single storage device or system. In another example, program code 220 can be located in computer readable media 222 that is distributed in multiple data processing systems. In other words, some instructions in program code 220 can be located in one data processing system while other instructions in program code 220 can be located in one or more other data processing systems. For example, a portion of program code 250 can be located in computer readable media 222 in a server computer while another portion of program code 220 can be located in computer readable media 222 located in a set of client computers.

The different components illustrated for data processing system 200 are not meant to provide architectural limitations to the manner in which different embodiments can be implemented. In some illustrative examples, one or more of the components may be incorporated in or otherwise form a portion of, another component. For example, memory 206, or portions thereof, may be incorporated in processor unit 204 in some illustrative examples. The different illustrative embodiments can be implemented in a data processing system including components in addition to or in place of those illustrated for data processing system 200. Other components shown in FIG. 2 can be varied from the illustrative examples shown. The different embodiments can be implemented using any hardware device or system capable of running program code 220.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system.

It is understood that although this disclosure includes a detailed description on cloud computing, implementation of the teachings recited herein are not limited to a cloud computing environment. Rather, illustrative embodiments are capable of being implemented in conjunction with any other type of computing environment now known or later developed. Cloud computing is a model of service delivery for enabling convenient, on-demand network access to a shared pool of configurable computing resources, such as, for example, networks, network bandwidth, servers, processing, memory, storage, applications, virtual machines, and services, which can be rapidly provisioned and released with minimal management effort or interaction with a provider of the service. This cloud model may include at least five characteristics, at least three service models, and at least four deployment models.

The characteristics may include, for example, on-demand self-service, broad network access, resource pooling, rapid elasticity, and measured service. On-demand self-service allows a cloud consumer to unilaterally provision computing capabilities, such as server time and network storage, as needed automatically without requiring human interaction with the service's provider. Broad network access provides for capabilities that are available over a network and accessed through standard mechanisms that promote use by heterogeneous thin or thick client platforms, such as, for example, mobile phones, laptops, and personal digital assistants. Resource pooling allows the provider's computing resources to be pooled to serve multiple consumers using a multi-tenant model, with different physical and virtual resources dynamically assigned and reassigned according to demand. There is a sense of location independence in that the consumer generally has no control or knowledge over the exact location of the provided resources, but may be able to specify location at a higher level of abstraction, such as, for example, country, state, or data center. Rapid elasticity provides for capabilities that can be rapidly and elastically provisioned, in some cases automatically, to quickly scale out and rapidly released to quickly scale in. To the consumer, the capabilities available for provisioning often appear to be unlimited and can be purchased in any quantity at any time. Measured service allows cloud systems to automatically control and optimize resource use by leveraging a metering capability at some level of abstraction appropriate to the type of service, such as, for example, storage, processing, bandwidth, and active user accounts. Resource usage can be monitored, controlled, and reported providing transparency for both the provider and consumer of the utilized service.

Service models may include, for example, Software as a Service (SaaS), Platform as a Service (PaaS), and Infrastructure as a Service (IaaS). Software as a Service is the capability provided to the consumer to use the provider's applications running on a cloud infrastructure. The applications are accessible from various client devices through a thin client interface, such as a web browser (e.g., web-based e-mail). The consumer does not manage or control the underlying cloud infrastructure including network, servers, operating systems, storage, or even individual application capabilities, with the possible exception of limited user-specific application configuration settings. Platform as a Service is the capability provided to the consumer to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service is the capability provided to the consumer to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of select networking components, such as, for example, host firewalls.

Deployment models may include, for example, a private cloud, community cloud, public cloud, and hybrid cloud. A private cloud is a cloud infrastructure operated solely for an organization, which is a preferred illustrative embodiment. The private cloud may be managed by the organization or a third party and may exist on-premises or off-premises. A community cloud is a cloud infrastructure shared by several organizations and supports a specific community that has shared concerns, such as, for example, mission, security requirements, policy, and compliance considerations. The community cloud may be managed by the organizations or a third party and may exist on-premises or off-premises. A public cloud is a cloud infrastructure made available to the general public or a large industry group and is owned by an organization selling cloud services. A hybrid cloud is a cloud infrastructure composed of two or more clouds, such as, for example, private, community, and public clouds, which remain as unique entities, but are bound together by standardized or proprietary technology that enables data and application portability, such as, for example, cloud bursting for load-balancing between clouds.

A cloud computing environment is service oriented with a focus on statelessness, low coupling, modularity, and semantic interoperability. At the heart of cloud computing is an infrastructure comprising a network of interconnected nodes.

Figure 3:
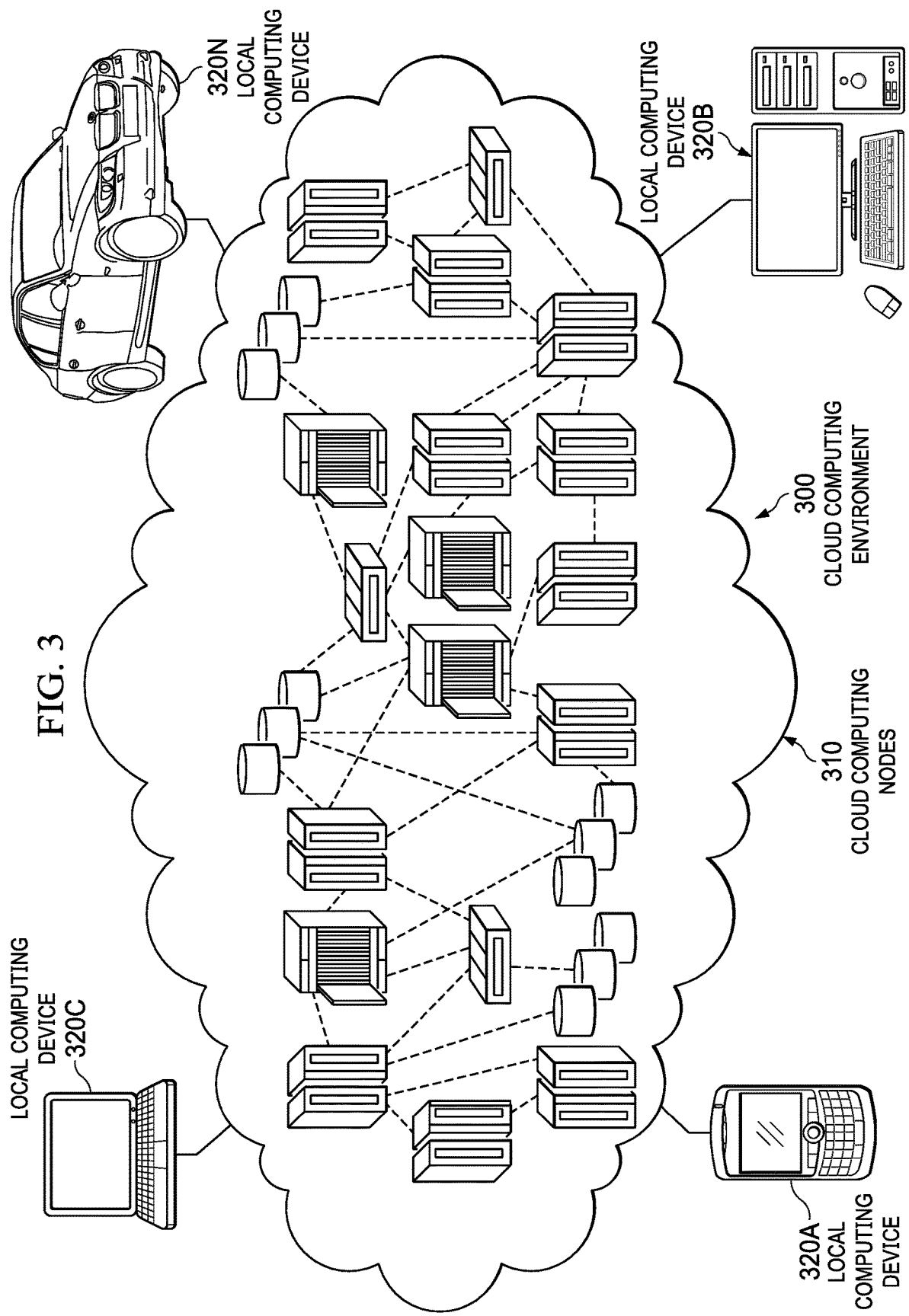
FIG. 3 is a diagram illustrating a cloud computing environment in which illustrative embodiments may be implemented.

With reference now to FIG. 3, a diagram illustrating a cloud computing environment is depicted in which illustrative embodiments may be implemented. In this illustrative example, cloud computing environment 300 includes a set of one or more cloud computing nodes 310 with which local computing devices used by cloud consumers, such as, for example, personal digital assistant or smart phone 320A, desktop computer 320B, laptop computer 320C, and/or automobile computer system 320N, may communicate. Cloud computing nodes 310 may be, for example, server 104 and server 106 in FIG. 1. Local computing devices 320A-320N may be, for example, clients 110-114 in FIG. 1.

Cloud computing nodes 310 may communicate with one another and may be grouped physically or virtually into one or more networks, such as private, community, public, or hybrid clouds as described hereinabove, or a combination thereof. This allows cloud computing environment 300 to offer infrastructure, platforms, and/or software as services for which a cloud consumer does not need to maintain resources on a local computing device, such as local computing devices 320A-320N. It is understood that the types of local computing devices 320A-320N are intended to be illustrative only and that cloud computing nodes 310 and cloud computing environment 300 can communicate with any type of computerized device over any type of network and/or network addressable connection using a web browser, for example.

Figure 4:
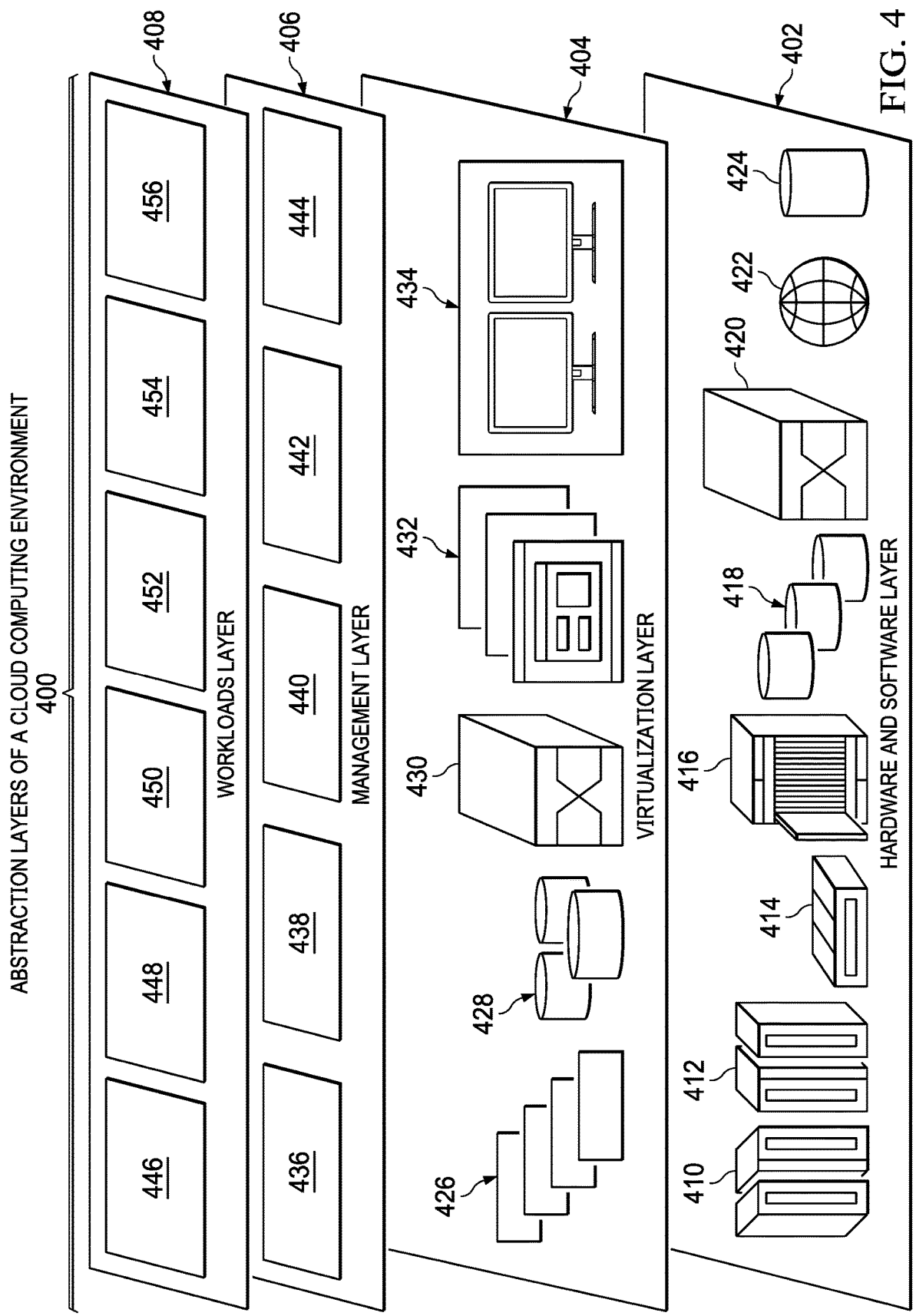
FIG. 4 is a diagram illustrating an example of abstraction layers of a cloud computing environment in accordance with an illustrative embodiment.

With reference now to FIG. 4, a diagram illustrating abstraction model layers is depicted in accordance with an illustrative embodiment. The set of functional abstraction layers shown in this illustrative example may be provided by a cloud computing environment, such as cloud computing environment 300 in FIG. 3. It should be understood in advance that the components, layers, and functions shown in FIG. 4 are intended to be illustrative only and embodiments of the invention are not limited thereto. As depicted, the following layers and corresponding functions are provided.

Abstraction layers of a cloud computing environment 400 include hardware and software layer 402, virtualization layer 404, management layer 406, and workloads layer 408. Hardware and software layer 402 includes the hardware and software components of the cloud computing environment. The hardware components may include, for example, mainframes 410, RISC (Reduced Instruction Set Computer) architecture-based servers 412, servers 414, blade servers 416, storage devices 418, and networks and networking components 420. In some illustrative embodiments, software components may include, for example, network application server software 422 and database software 424.

Virtualization layer 404 provides an abstraction layer from which the following examples of virtual entities may be provided: virtual servers 426; virtual storage 428; virtual networks 430, including virtual private networks; virtual applications and operating systems 432; and virtual clients 434.

In one example, management layer 406 may provide the functions described below. Resource provisioning 436 provides dynamic procurement of computing resources and other resources, which are utilized to perform tasks within the cloud computing environment. Metering and pricing 438 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 440 provides access to the cloud computing environment for consumers and system administrators. Service level management 442 provides cloud computing resource allocation and management such that required service levels are met. Service level agreement (SLA) planning and fulfillment 444 provides pre-arrangement for, and procurement of, cloud computing resources for which a future requirement is anticipated in accordance with an SLA.

Workloads layer 408 provides examples of functionality for which the cloud computing environment may be utilized. Example workloads and functions, which may be provided by workload layer 408, may include mapping and navigation 446, software development and lifecycle management 448, virtual classroom education delivery 450, data analytics processing 452, transaction processing 454, and conversation loop detection and resolution management 456.

Meetings consume participants' time and may not produce the expected results due to conversation loops and misunderstanding of discussed topics. Bad meetings are a big issue in the today's modern workplace. Recent statistics show that approximately 55 million meetings occur per day, that most meeting last one hour or less, and that most meetings involve 5 or fewer participants. The cost of these meetings is approximately 1.4 trillion dollars per year, with up to 213 billion dollars wasted due to bad meetings. Existing solutions merely focus on automatically taking notes from the meetings and scheduling possible next action steps.

Illustrative embodiments recognize and take into account conversation loops and unfinished topics during meetings. For example, different groups, such as, for example, sales representatives comprising one group and a legal team comprising another group, discussing a topic in the same meeting may create conversation loops during the meeting because each group may have a different understanding of the topic and terms being discussed. Similarly, a global enterprise may schedule a meeting between all of its chief financial officers located throughout different geographic locations around the world to discuss a new approach to late payment fees. During the meeting, words spoken and terms discussed may potentially have different meanings with regard to the different languages associated with the meeting participants from different geographic locations, which may create a conversation loop due to the different interpretations of words and terms.

Illustrative embodiments generate visual representations, such as, for example, concept maps, mind maps, and the like, in real time within an improved graphical user interface dashboard during the meeting to assist participating entities in resolving detected conversation loops and unfinished topics. Illustrative embodiments may also utilize the dashboard to request input (i.e., feedback) from participating entities with regard to what each participating entity believes a particular word or term means with respect to the topic being discussed in order to find a consensus of meaning between the participating entities. The graphical user interface dashboard may be, for example, a wiki-like graphical user interface dashboard that allows multiple participating entities to provide input simultaneously or substantially at a same time while the meeting is in progress. Once illustrative embodiments determine that participating entities have reached a consensus based on the feedback input into the dashboard, illustrative embodiments can indicate in the dashboard that the conversation loop has been resolved and that the participating entities should move on in the meeting conversation.

Illustrative embodiments detect meeting conversation loops via: a) a knowledgebase containing a plurality of topics, related concepts, content of previous meetings between participating entities in a current meeting, content of previous meetings between other entities in same or similar type meetings, participant entity feedback, and the like; b) attributes, properties, and features of a meeting conversation, such as, for example, participant entity tone of voice, sentence structure, and the like; and c) relationships between topics and concepts and a determination of a common or typical time to discuss topics against a current amount of time already spent on discussing each topic according to meeting objectives.

Illustrative embodiments resolve meeting conversation loops via: a) a time-aware visual representation (e.g., concept map and/or mind map) of the conversation that is viewable and editable by participating entities concurrently and is expanded in real time as the conversation progresses to detect and resolve conversation loops; b) retrieval of information corresponding to past meeting conversations between the participating entities and communication data; c) real-time participating entity input (i.e., feedback) corresponding to resolving detected conversation loops; and d) automatic augmentation of the knowledgebase with the participating entity input regarding resolution of the conversation loops during the meeting for future conversation loop detection and resolution by illustrative embodiments.

As a result, illustrative embodiments are capable of reducing participant time in a meeting by decreasing misunderstanding of topics and concepts, which create conversation loops between participating entities during the meeting, using an improved graphical user interface dashboard that shows a real time visual representation of the conversation and detected conversation loops, along with retrieved material to support resolution of the detected conversation loop. Thus, illustrative embodiments provide one or more technical solutions that overcome a technical problem with detecting and resolving conversation loops in real time during a multiparticipant meeting conducted via a network. As a result, these one or more technical solutions provide a technical effect and practical application in the field of graphical user interfaces.

Figure 5:
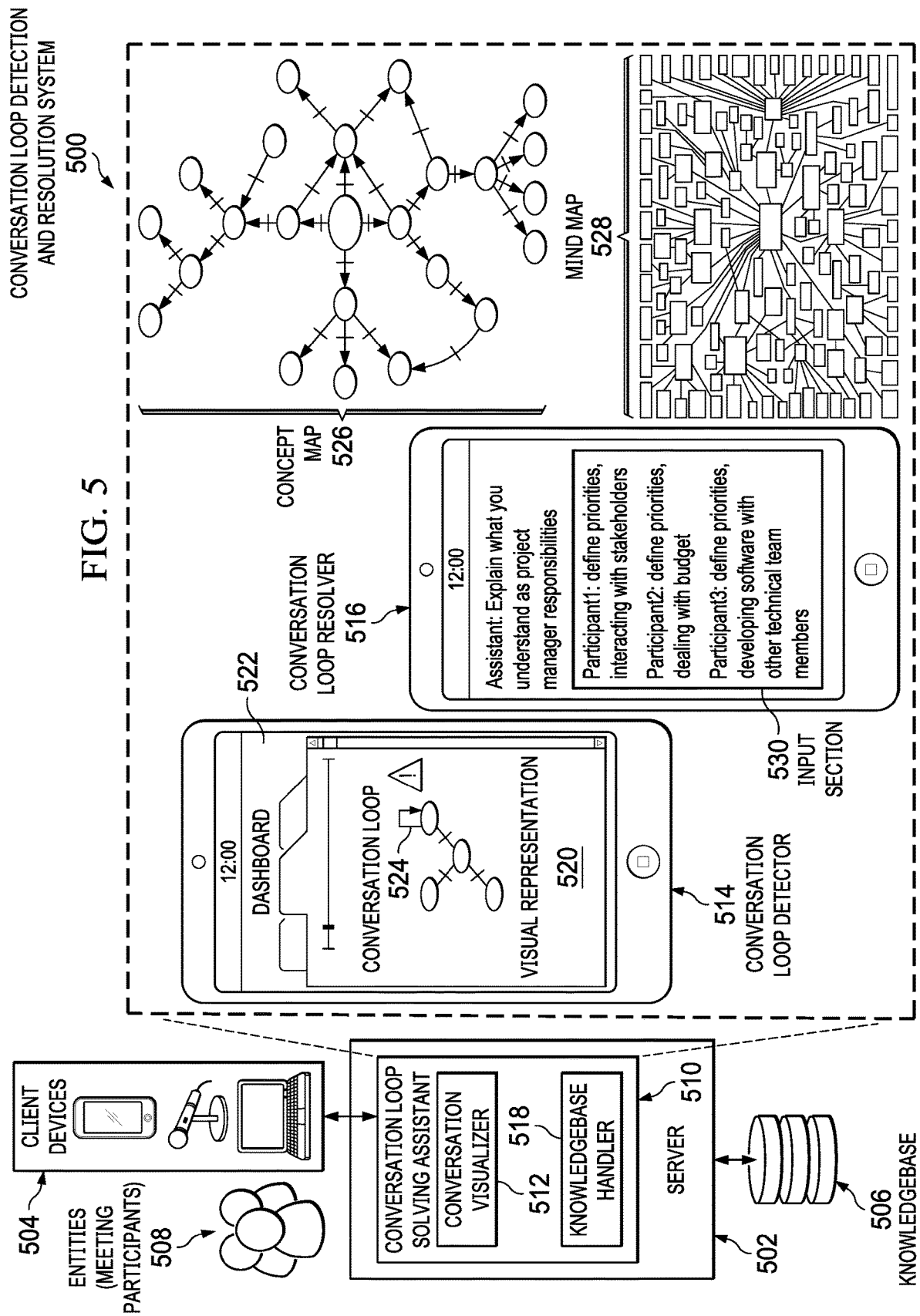
FIG. 5 is a diagram illustrating an example of a conversation loop detection and resolution system in accordance with an illustrative embodiment.

With reference now to FIG. 5, a diagram illustrating an example of a conversation loop detection and resolution system is depicted in accordance with an illustrative embodiment. Conversation loop detection and resolution system 500 may be implemented in a network of data processing systems, such as network data processing system 100 in FIG. 1, or a cloud computing environment, such as cloud computing environment 300 in FIG. 3. Conversation loop detection and resolution system 500 is a system of hardware and software components for detecting and resolving conversation loops that occur during conversations between participating entities in meetings.

In this example, conversation loop detection and resolution system 500 includes server 502, client devices 504, and knowledgebase 506. However, it should be noted that conversation loop detection and resolution system 500 is intended as an example only and not as a limitation of illustrative embodiments. In other words, conversation loop detection and resolution system 500 may include any number of servers, client devices, knowledgebases, and other devices not shown.

Server 502 may be, for example, server 104 in FIG. 1, data processing system 200 in FIG. 2, or a cloud computing node in cloud computing nodes 310 in FIG. 3. Server 502 hosts the conversation loop detection and resolution service provided to client devices 504. Server 502 is coupled to client devices 504 and knowledgebase 506 via a network, such as, for example, network 102 in FIG. 1.

Client devices 504 may be, for example, clients 110-114 in FIG. 1 or local computing devices 320A-320N in FIG. 3. Client devices 504 are user equipment, such as, for example, computers, multimedia centers (e.g., smart televisions), smartphones, laptops, handheld computers (e.g., tablets), microphones, or any combination thereof, used by entities 508 during a meeting. Entities 508 represent a plurality of different entities participating in the meeting and may include people, artificial intelligence-based entities, or a combination thereof. Knowledgebase 506 may be, for example, knowledgebase 108 in FIG. 1 and represents a local data source for server 502.

Server 502 includes conversation loop solving assistant 510. Conversation loop solving assistant 510 may be, for example, conversation loop solving assistant 218 in FIG. 2. In this example, conversation loop solving assistant 510 is comprised of a plurality of components. For example, conversation loop solving assistant 510 is comprised of conversation visualizer 512, conversation loop detector 514, conversation loop resolver 516, and knowledgebase handler 518. However, it should be noted that conversation loop solving assistant 510 may be comprised of more or fewer components than shown. For example, one component may be divided into two or more components, two or more components may be combined into one component, components not shown may be added, or the like.

Conversation visualizer 512 is the component responsible for generating visual representation 520 of the conversation between entities 508 within dashboard 522 in real time during the meeting. Visual representation 520 may be comprised of, for example, concept map 526 and/or mind map 528. Dashboard 522 is a graphical user interface that is viewable and editable by entities 508 within client devices 504 during the meeting in real time simultaneously. Conversation loop detector 514 is the component responsible for detecting conversation loop 524 in the conversation during the meeting and graphically indicating where conversation loop 524 is occurring in the conversation within visual representation 520.

Conversation loop resolver 516 is the component responsible for assisting entities 508 to resolve detected conversation loop 524 in the conversation. For example, conversation loop resolver 516 may generate a statement or question regarding conversation loop 524 and display the statement or question next to input section 530 within dashboard 522. In addition, conversation loop resolver 516 may display to entities 508 within dashboard 522 support material, which was retrieved by knowledgebase handler 518 from knowledgebase 506, for resolving conversation loop 524. Entities 508 may input a response (i.e., feedback) to the statement or question to resolve detected conversation loop 524. Based on the responses within input section 530, conversation loop resolver 516 may determine that a consensus among entities 508 has been reached and that conversation loop 524 has been resolved.

Knowledgebase handler 518 is the component responsible interacting with knowledgebase 506. In addition, knowledgebase handler 518 determines related concepts to the topic being discussed by entities 508 and an amount of time to discuss the topic during the meeting. In other words, knowledgebase handler 518 performs analytics to determine the common or typical amount of time needed to discuss that particular topic. In addition to information regarding a plurality of topics and related concepts being stored in knowledgebase 506, knowledgebase 506 may store profiles of previous meeting conversations, which may include, for example, tone of voice of participating entities, sentence structure, expressed sentiments, and the like. Further, the profile may include an atypical time or number of repetitions for a term or phrase to be discussed based on the particular topic being discussed during the meeting.

With reference now to FIG. 6, a diagram illustrating an example of a conversation loop detection process is depicted in accordance with an illustrative embodiment. Conversation loop detection process 600 may be implemented in a computer, such as, for example, server 104 in FIG. 1, data processing system 200 in FIG. 2, a cloud computing node in cloud computing nodes 310 in FIG. 3, or server 502 in FIG. 5.

Conversation loop detection process 600 includes meeting conversation between participating entities 602. The participating entities may be, for example, entities 508 in FIG. 5. The meeting conversation includes topics 604 and transitions to different topics in the meeting conversation 606. In this example, topics 604 include team definition, major infrastructure component definition, project manager definition, and project manager responsibilities. However, it should be noted that meeting conversation between participating entities 602 may include any number and type of topics discussed. Transitions to different topics in the meeting conversation 606 represent each transition between the different topics in topics 604.

In this example, the goal of meeting conversation between participating entities 602 is to define major priorities for an organization regarding an Information Technology project. The participating entities in this conversation do not have a common understanding of responsibilities of a project manager. As a result, the participating entities are having a problem deciding who is the best person to be the project manager. Consequently, the participating entities keep returning to the project manager definition and project manager responsibilities topics, which creates conversation loop 608, such as, for example, conversation loop 524 in FIG. 5.

Illustrative embodiments detect conversation loop 608 and assist the participating entities in resolving conversation loop 608. For example, illustrative embodiments can retrieve a definition and responsibilities of a project manager corresponding to the organization from the organization's knowledgebase, such as, for example, knowledgebase 506 in FIG. 5. Illustrative embodiments can then present the project manager definition and responsibilities in a graphical user interface dashboard viewable by all participating entities in the meeting. As a result, illustrative embodiments enable all participating entities in the meeting to have the same understanding so that the participating entities can finally select the right person to be the project manager and move on to the next topic.

Figure 7C:
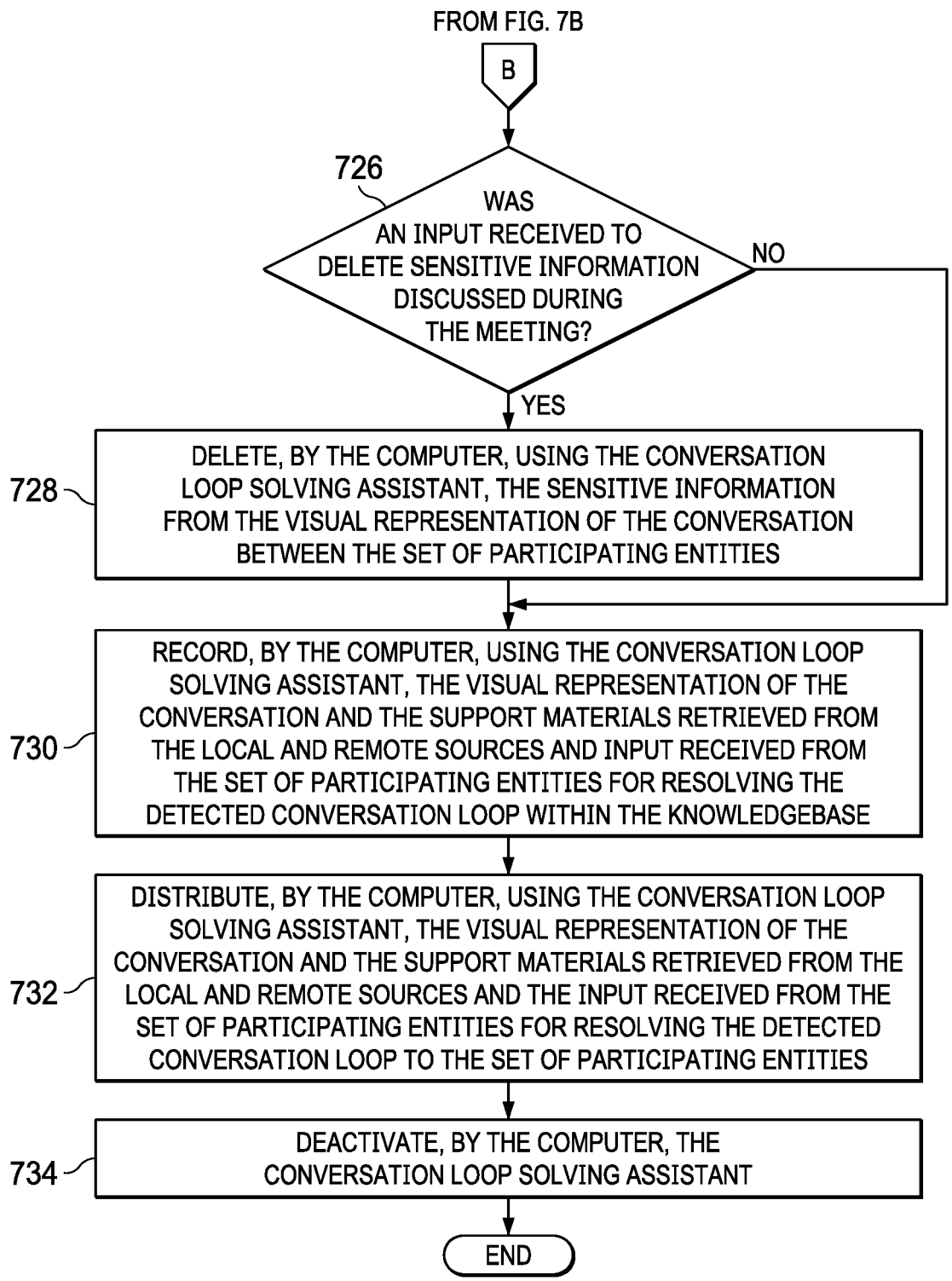

With reference now to FIGS. 7A-7C, a flowchart illustrating a process for detecting and resolving conversation loops during a meeting is shown in accordance with an illustrative embodiment. The process shown in FIGS. 7A-7C may be implemented in a computer, such as, for example, server 104 in FIG. 1, data processing system 200 in FIG. 2, a cloud computing node in cloud computing nodes 310 in FIG. 3, or server 502 in FIG. 5.

The process begins when the computer receives an input to activate a conversation loop solving assistant for a meeting having a set of two or more participating entities (step 702). The conversation loop solving assistant supports the set of participating entities in resolving any conversation loops detected in a conversation between the participating entities during the meeting. The computer, using the conversation loop solving assistant, generates a dashboard containing a visual representation of the conversation between the set of participating entities in the meeting that is viewable and editable in real time by the set of participating entities concurrently during the meeting (step 704). The visual representation may include a concept map, a mind map, or a combination of both.

If the meeting is a face to face meeting between participating entities, then the computer, using the conversation loop solving assistant, shares or projects the visual representation of the conversation via, for example, a television or a projector, which is a client device of the computer. Also, if the meeting is face to face, then a microphone, which also is a client device of the computer, needs to be accessible by the participating entities.

The computer, using the conversation loop solving assistant, receives a topic corresponding to the meeting from one or more of the set of participating entities to prevent false positive identification of conversation loops regarding normal discussion around repetitive subtopics associated with the topic (step 706). However, it should be noted that receiving the topic of the meeting from a participating entity is optional. The computer, using the conversation loop solving assistant, monitors the conversation between the set of participating entities during the meeting (i.e., while the meeting is in progress) (step 708). The conversation loop solving assistant may monitor the conversation using, for example, speech-to-text technologies, natural language processing, or the like.

The computer, using the conversation loop solving assistant, updates the visual representation of the conversation between the set of participating entities within the dashboard when one or more of a first predefined set of triggers are activated based on the monitoring of the conversation (step 710). The first predefined set of triggers are selected from a group consisting of: expiration of predetermined fixed time intervals; detection of a change in topic being discussed; detection of predetermined keywords being spoken by any participating entity; detection of a predetermined tone of voice; and detection of a predetermined sentence structure. The predetermined keywords may be, for example, "action needed", "change topic", "problem", "solution", "reason for", and the like. The predetermined sentence structure may be, for example, a question being asked by a participating entity.

In addition to utilizing predetermined keywords, the conversation loop solving assistant may utilize a machine learning model to process the content of the topic being discussed in the meeting. Such machine learning models are capable of automatically identifying keywords by discarding other words that are not critical for determining whether to update the structure of the visual representation of the conversation. An example of such a machine learning model is a naïve Bayes classifier. Using a naïve Bayes classifier for each sentence spoken, the conversation loop solving assistant can extract a subset of relevant keywords and compare the extracted subset of relevant keywords with keywords in the knowledgebase to determine if indeed the extracted keywords are critical or not to update the structure of the visual representation based on the current topic being discussed.

Alternative illustrative embodiments for updating the visual representation may include, for example: 1) a meeting organizer or creator interacting with the conversation loop solving assistant to define relevant topics or keywords, such as, for example, "project description", "team members", "to-do list", "responsible", "goal", "objective", "meeting over", and the like, in order for the conversation loop solving assistant to create concept and mind maps; 2) the meeting organizer saying a particular keyword that corresponds to one of the defined relevant topics for discussion or information regarding that particular topic in order for the conversation loop solving assistant to fill up a concept map or mind map for the topic; or 3) the meeting organizer interacting with the conversation loop solving assistant to, for example, add keywords, create topic intersections, split topics into subtopics, and the like, to provide feedback to the conversation loop solving assistant for fine-tuning (i.e., training) the conversation loop solving assistant.

The computer, using the conversation loop solving assistant, detects a conversation loop in the conversation between the set of participating entities when one or more of a second predefined set of triggers are activated based on the monitoring of the conversation and the updating of the visual representation of the conversation within the dashboard (step 712). The second predefined set of triggers are selected from a group consisting of: the visual representation of the conversation has not evolved for a first predetermined time interval; topic similarity exceeds a predetermined topic similarity threshold for a second predetermined time interval; creation of parallel topic discussions that do not intersect for a third predetermined time interval; and lack of understanding is expressed a predetermined number of times within a fourth predetermined time interval.

In response to detecting the conversation loop in the conversation, the computer, using the conversation loop solving assistant, retrieves support materials from at least one of local sources including a knowledgebase of recorded visual representations of previous meetings between the set of participating entities and recorded visual representations of previous meetings between other entities and remote sources including websites and search results that provide support for resolving the detected conversation loop (step 714). For example, for topics that are internal to the organization of the participating entities, the conversation loop solving assistant may search the organization's websites and databases and also search the organization's knowledgebase for previous concept and mind maps created from other meetings for support material to assist in resolving the conversation loop. The conversation loop solving assistant may then select, for example, the 5 highest-ranking relevant topic headlines, allowing participating entities to click on a corresponding link to go further and take a vote as to which topic headline would be most inclusive. For topics that are external to the organization, the conversation loop solving assistant may utilize a search engine to search remote websites and databases for support material to assist in resolving the conversation loop. For topics that require knowledge of a subject matter expert, the conversation loop solving assistant can recommend a person that would be able to provide support information for resolving the conversation loop by accessing the organization's human resource database or employee directory, for example.

The computer, using the conversation loop solving assistant, displays the support materials in the dashboard along with an input section for the set of participating entities to indicate a consensus for resolving the detected conversation loop (step 716). The computer, using the conversation loop solving assistant, makes a determination as to whether a consensus for resolving the detected conversation loop was received in the input section of the dashboard from the set of participating entities (step 718).

In response to determining that a consensus for resolving the detected conversation loop was received in the input section of the dashboard from the set of participating entities, yes output of step 718, then the computer, using the conversation loop solving assistant, records the detected conversation loop as resolved in the knowledgebase (step 720). Thereafter, the process proceeds to step 726. In response to determining that a consensus for resolving the detected conversation loop was not received in the input section of the dashboard from the set of participating entities, no output of step 718, then the computer, using the conversation loop solving assistant, displays an indication within the dashboard for the set of participating entities to move on to a next topic in the meeting (step 722). In addition, the computer, using the conversation loop solving assistant, adjusts a level of importance of a set of keywords corresponding to the topic currently being discussed in the knowledgebase based on the indication to move on to the next topic in the meeting (step 724). For example, the conversation loop solving assistant may decrease a weight associated with the set of keywords corresponding to the topic based on the indication to move on to the next topic in the meeting.

Further, the computer, using the conversation loop solving assistant, makes a determination as to whether an input was received to delete sensitive information discussed during the meeting (step 726). In response to determining that an input was not received to delete sensitive information discussed during the meeting, no output of step 726, then the process proceeds to step 730. In response to determining that an input was received to delete the sensitive information discussed during the meeting, yes output of step 726, then the computer, using the conversation loop solving assistant, deletes the sensitive information from the visual representation of the conversation between the set of participating entities (step 728). In one illustrative embodiment, the conversation loop solving assistant will only accept the input to delete sensitive information from the organizer of the meeting. In an alternative illustrative embodiment, the conversation loop solving assistant will accept the input to delete sensitive information from any participating entity during the meeting.

Furthermore, the computer, using the conversation loop solving assistant, records the visual representation of the conversation and the support materials retrieved from the local and remote sources and input received from the set of participating entities for resolving the detected conversation loop within the knowledgebase (step 730). The computer, using the conversation loop solving assistant, distributes the visual representation of the conversation and the support materials retrieved from the local and remote sources and the input received from the set of participating entities for resolving the detected conversation loop to the set of participating entities (step 732). The computer, deactivates the conversation loop solving assistant (step 734). Thereafter, the process terminates.

Thus, illustrative embodiments of the present invention provide a computer-implemented method, computer system, and computer program product for assisting meeting participants via conversation loop detection and resolution using an improved graphical user interface dashboard that includes conversation visual representations and time-related usage of topics during the meeting in real time. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for detecting and resolving conversation loops during a meeting, the computer-implemented method comprising:
    monitoring, by a computer, a conversation between a set of participating entities during the meeting;
    updating, by the computer, a visual representation of the conversation between the set of participating entities within a dashboard when one or more of a first predefined set of triggers are activated based on the monitoring of the conversation;
    detecting, by the computer, a conversation loop in the conversation between the set of participating entities when one or more of a second predefined set of triggers are activated based on the monitoring of the conversation and the updating of the visual representation of the conversation within the dashboard;
    retrieving, by the computer, support materials that provide support for resolving the conversation loop from at least one of local sources including a knowledgebase and remote sources including websites; and
    displaying, by the computer, the support materials in the dashboard along with an input section for the set of participating entities to indicate a consensus for resolving the conversation loop.

2. The computer-implemented method of claim 1, wherein the first predefined set of triggers are selected from a group consisting of expiration of predetermined fixed time intervals, detection of a change in topic being discussed, detection of predetermined keywords being spoken by any participating entity, detection of a predetermined tone of voice, and detection of a predetermined sentence structure.

3. The computer-implemented method of claim 1, wherein the second predefined set of triggers are selected from a group consisting of the visual representation of the conversation has not evolved for a first predetermined time interval, topic similarity exceeds a predetermined topic similarity threshold for a second predetermined time interval, creation of parallel topic discussions that do not intersect for a third predetermined time interval, and lack of understanding is expressed a predetermined number of times within a fourth predetermined time interval.

4. The computer-implemented method of claim 1 further comprising:
    responsive to determining that a consensus for resolving the conversation loop was received in the input section of the dashboard from the set of participating entities, recording, by the computer, the conversation loop as resolved in the knowledgebase.

5. The computer-implemented method of claim 1 further comprising:

responsive to determining that a consensus for resolving the conversation loop was not received in the input section of the dashboard from the set of participating entities, displaying, by the computer, an indication within the dashboard for the set of participating entities to move on to a next topic in the meeting; and adjusting, by the computer, a level of importance of a set of keywords corresponding to a topic currently being discussed in the knowledgebase based on the indication to move on to the next topic in the meeting.

6. The computer-implemented method of claim 1 further comprising:

determining, by the computer, whether an input was received to delete sensitive information discussed during the meeting; and responsive to determining that an input was received to delete the sensitive information discussed during the meeting, deleting, by the computer, the sensitive information from the visual representation of the conversation between the set of participating entities.

7. The computer-implemented method of claim 1 further comprising:

recording, by the computer, the visual representation of the conversation, and the support materials retrieved from the local sources and the remote sources and input received from the set of participating entities for resolving the conversation loop within the knowledgebase; and distributing, by the computer, the visual representation of the conversation, and the support materials retrieved from the local sources and the remote sources and the input received from the set of participating entities for resolving the conversation loop, to the set of participating entities.

8. The computer-implemented method of claim 1, wherein the dashboard is a graphical user interface that is viewable and editable by the set of participating entities concurrently during the meeting.

9. The computer-implemented method of claim 1, wherein the visual representation of the conversation between the set of participating entities includes at least one of a concept map and a mind map, and where the visual representation of the conversation between the set of participating entities graphically indicates where the conversation loop occurred.

10. The computer-implemented method of claim 1, wherein the set of participating entities in the meeting are selected from a group consisting of people and artificial intelligence-based entities.

11. The computer-implemented method of claim 1, wherein the knowledgebase contains a plurality of topics, related concepts, content of previous meetings between the set of participating entities in the meeting, content of previous meetings between other entities in same or similar type meetings, and participating entity feedback.

12. The computer system of claim 11, wherein the first predefined set of triggers are selected from a group consisting of expiration of predetermined fixed time intervals, detection of a change in topic being discussed, detection of predetermined keywords being spoken by any participating entity, detection of a predetermined tone of voice, and detection of a predetermined sentence structure.

13. The computer system of claim 11, wherein the second predefined set of triggers are selected from a group consisting of the visual representation of the conversation has not evolved for a first predetermined time interval, topic similarity exceeds a predetermined topic similarity threshold for a second predetermined time interval, creation of parallel topic discussions that do not intersect for a third predetermined time interval, and lack of understanding is expressed a predetermined number of times within a fourth predetermined time interval.

14. The computer-implemented method of claim 1, wherein the computer is located in a cloud environment providing a conversation loop detection and resolution service.

15. A computer system for detecting and resolving conversation loops during a meeting, the computer system comprising:

a bus system;

a storage device connected to the bus system, wherein the storage device stores program instructions; and a processor connected to the bus system, wherein the processor executes the program instructions to:

monitor a conversation between a set of participating entities during the meeting;

update a visual representation of the conversation between the set of participating entities within a dashboard when one or more of a first predefined set of triggers are activated based on the monitoring of the conversation;

detect a conversation loop in the conversation between the set of participating entities when one or more of a second predefined set of triggers are activated based on monitoring the conversation and updating the visual representation of the conversation within the dashboard;

retrieve support materials that provide support for resolving the conversation loop from at least one of local sources including a knowledgebase and remote sources including websites; and display the support materials in the dashboard along with an input section for the set of participating entities to indicate a consensus for resolving the conversation loop.

16. A computer program product for detecting and resolving conversation loops during a meeting, the computer program product comprising a computer readable storage medium having program instructions embodied therewith, the program instructions executable by a computer to cause the computer to perform a method comprising:

monitoring, by the computer, a conversation between a set of participating entities during the meeting;

updating, by the computer, a visual representation of the conversation between the set of participating entities within a dashboard when one or more of a first predefined set of triggers are activated based on the monitoring of the conversation;

detecting, by the computer, a conversation loop in the conversation between the set of participating entities when one or more of a second predefined set of triggers are activated based on the monitoring of the conversation and the updating of the visual representation of the conversation within the dashboard;

retrieving, by the computer, support materials that provide support for resolving the conversation loop from at least one of local sources including a knowledgebase and remote sources including websites; and displaying, by the computer, the support materials in the dashboard along with an input section for the set of participating entities to indicate a consensus for resolving the conversation loop.

17. The computer program product of claim 16, wherein the first predefined set of triggers are selected from a group consisting of expiration of predetermined fixed time intervals, detection of a change in topic being discussed, detection of predetermined keywords being spoken by any participating entity, detection of a predetermined tone of voice, and detection of a predetermined sentence structure.

18. The computer program product of claim 16, wherein the second predefined set of triggers are selected from a group consisting of the visual representation of the conversation has not evolved for a first predetermined time interval, topic similarity exceeds a predetermined topic similarity threshold for a second predetermined time interval, creation of parallel topic discussions that do not intersect for a third predetermined time interval, and lack of understanding is expressed a predetermined number of times within a fourth predetermined time interval.

19. The computer program product of claim 16 further comprising:

responsive to determining that a consensus for resolving the conversation loop was received in the input section of the dashboard from the set of participating entities, recording, by the computer, the conversation loop as resolved in the knowledgebase.

20. The computer program product of claim 16 further comprising:

responsive to determining that a consensus for resolving the conversation loop was not received in the input section of the dashboard from the set of participating entities, displaying, by the computer, an indication within the dashboard for the set of participating entities to move on to a next topic in the meeting; and adjusting, by the computer, a level of importance of a set of keywords corresponding to a topic currently being discussed in the knowledgebase based on the indication to move on to the next topic in the meeting.

* * * * *